July 16, 1968     H. C. KELSAY     3,392,932
SEAT BELT RETRACTOR CATCH
Filed Jan. 10, 1967
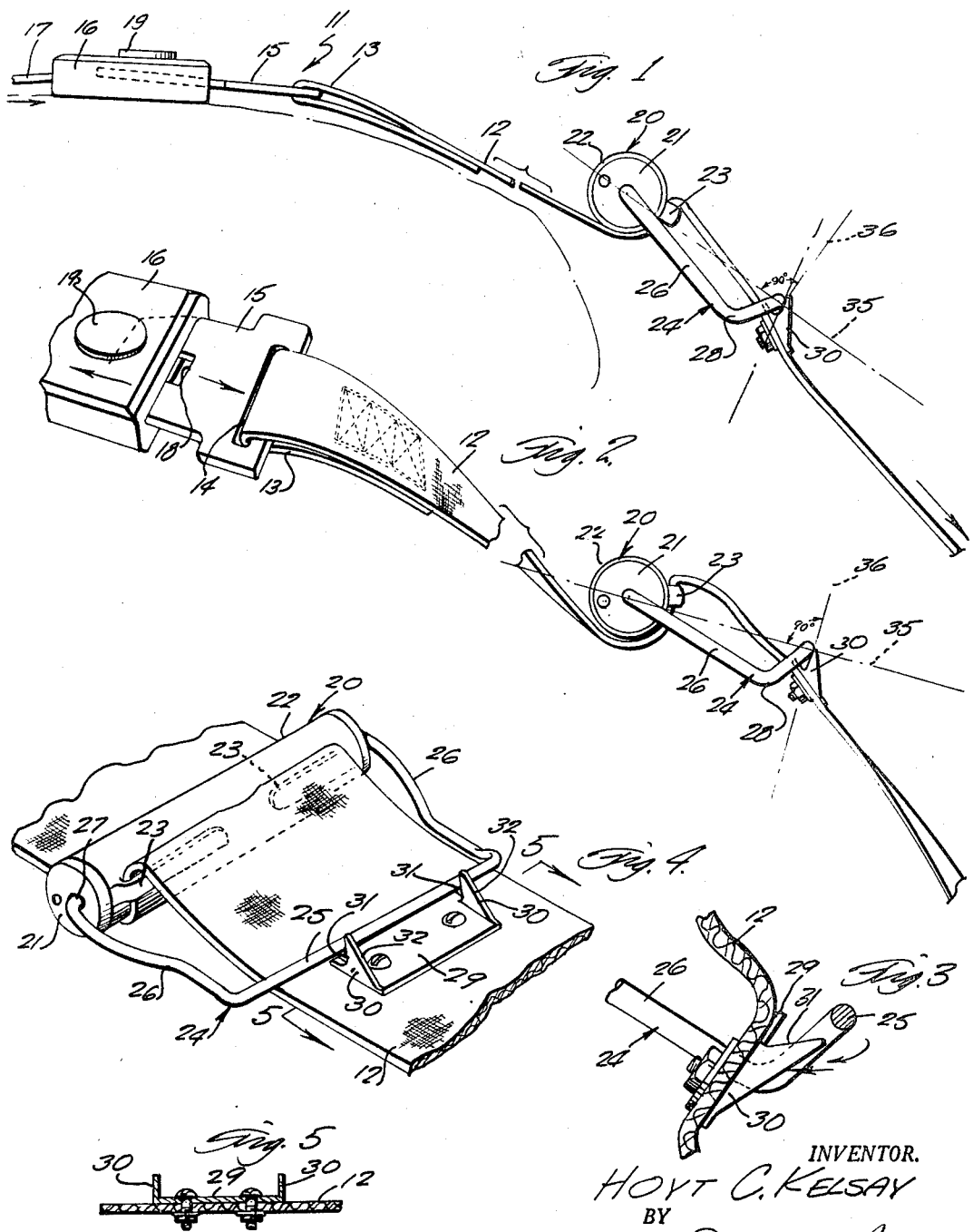
INVENTOR.
HOYT C. KELSAY
BY
Berman, Davidson & Berman
ATTORNEYS

United States Patent Office 3,392,932
Patented July 16, 1968

3,392,932
SEAT BELT RETRACTOR CATCH
Hoyt C. Kelsay, 3129 Julian Drive,
Raleigh, N.C. 27604
Filed Jan. 10, 1967, Ser. No. 608,334
4 Claims. (Cl. 242—107.2)

ABSTRACT OF THE DISCLOSURE

A flexible seat belt having a spring retractor. A loop is pivoted to the retractor and is engageable with an abutment catch on the belt to hold the belt against retraction when it is extended for use, to prevent the belt retractor from exerting uncomfortable retracting force on the person using the belt. The loop automatically slips off and disengages from the catch when the belt is manually unfastened.

This invention relates to seat belts, and more particularly to improvements in motor vehicle seat belts of the self-retracting type.

A main object of the invention is to provide a novel and improved seat belt assembly of the type wherein the flexible bands comprising the assembly are provided with spring retractor devices so that the bands roll up when not in use, the assembly being provided with means to absorb the force of the spring retractors when the bands are connected together around the body of the user so that the user is not subjected to the spring tension of the spring retractors, while, at the same time, the user is protected by the seat belt assembly as intended.

A further object of the invention is to provide an improved seat belt assembly of the type wherein the band elements thereof are provided with spring retractors, the assembly including means to oppose the spring tension of the retractor elements when the seat belt assembly is in use, whereby the user is not subjected to the spring tension of the retractor elements and whereby discomfort from such spring tension is avoided, without reducing the security and protection provided by the seat belts.

A still further object of the invention is to provide an improved seat belt assembly for use on motor vehicles, the assembly being of the type provided with flexible bands having spring retractors to roll up the bands when not in use, the assembly being provided with means to absorb the tension of the spring retractors when the bands are connected together around the body of a user, the assembly involving relatively simple components, being easy to fabricate, being substantially automatic in operation, and allowing the seat belt bands to be fastened and unfastened in the normal manner and with a minimum of effort.

Further objects and advantages of the invention will become apparent from the following description and claims, and from the accompanying drawing, wherein:

FIGURE 1 is a side elevational view of a portion of a motor vehicle seat belt assembly constructed in accordance with the present invention, showing one of the flexible band elements in extended position with the buckle end thereof engaged with the cooperating buckle element of the mating flexible band element of the assembly.

FIGURE 2 is a fragmentary perspective view of the structure shown in FIGURE 1 with the flexible band element thereof about to be disconnected from the buckle element of the mating flexible band and illustrating the manner in which the bight portion of the loop member of the retractor of the band slides upwardly to disengage from the abutment lugs on the adjacent portion of the band.

FIGURE 3 is an enlarged fragmentary longitudinal cross-sectional view taken through the portion of the flexible belt band carrying the abutment lugs and showing generally the configuration of the band after it has been disconnected from the mating band of the seat belt assembly and showing how the bight portion of the pivoted loop member tends to slip away from the abutment lugs as the band is released.

FIGURE 4 is an enlarged fragmentary perspective view showing the pivoted loop member engaged with the abutment lugs to take up the tension of the spring retractor when the seat belt band is in use.

FIGURE 5 is a transverse vertical cross-sectional view taken substantially on the line 5—5 of FIGURE 4.

Referring to the drawing, 11 generally designates a motor vehicle safety seat belt assembly of the type comprising flexible bands adapted to be anchored at one end to a fixed portion of a motor vehicle and provided at their other ends with buckle elements adapted to lockingly interengage. Thus, in the seat belt assembly 11, 12 designates one of the flexible bands, the band 12 being formed at its free end with a loop 13 engaging through a slot 14 in a buckle element 15 which is adapted to lockingly interengage with a cooperating buckle element 16 on the other flexible band 17 of the assembly. The buckle element 16 is of conventional construction and is provided with snap-locking means cooperating with the tongue-shaped element 15 and having bolt means engageable in an aperture 18 of the tongue element 15. The member 16 is provided with a manually-operated release button 19 for disconnecting the buckle member 16 from the locking tongue member 15.

The flexible bands of the seat belt assembly 11 are of the type provided with conventional spring retractors for automatically rolling up the bands when they are not in use. Thus, the band 12 is provided with a spring retractor assembly 20 of the type comprising an inner core 21 and an outer sleeve 22, the outer sleeve 22 being cylindrical in shape and being provided with inwardly-facing resilient spring clips 23, 23 which are lockingly engageable with the flexible band 12 so that the assembly 20 may be anchored thereto at a desired location on the band, namely, at a location such that the band will be rolled up substantially in its entirety by the action of the spring retractor assembly 20. The details of the assembly 20 are, in themselves, conventional, it being understood that a suitable spring is contained inside the sleeve 22, with one end of the spring anchored to the core member 21 and the other end of the spring anchored to the sleeve member 22, whereby torque is exerted between the core portion 21 and the sleeve member 22 when the spring is placed under tension. When the band is free, the band is substantially rolled up around the sleeve 22.

Designated generally at 24 is a loop member which is pivoted to the core 21 on the axis thereof, the loop member 24 comprising the straight transversely-extending bight portion 25 and the parallel bent side arms 26, 26. The side arms 26 terminate in inwardly-directed pivot lugs 27 which are rotatably-received axially in the opposite end portions of the core 21.

The side arms 26 are generally L-shaped, as shown in FIGURE 2, being formed with the obtuse-angled bends 28 adjacent the bight portion 25.

Secured transversely on the flexible band 12 adjacent to the location of the retractor assembly 20 is a plate member 29 formed at its opposite ends with upstanding, generally triangular lugs 30, 30 which extend substantially longitudinally of the flexible band 12, as shown in FIGURE 4. The upstanding lugs 30, 30 are formed with concave end edges 31 facing the retractor assembly 20 and being shaped to simultaneously lockingly-receive the bight portion 25 of the loop member 24, as shown in FIGURE 4. Thus, when the bands are extended, for example, to positions wherein they can be fastened together in the manner illustrated in FIGURES 1 and 2, the bight portions 25 associated with the spring retractor assembly 20 are engageable over the inclined rear edges 32, 32 of the lugs 30, 30 and slip into engagement in the concave edge portions 31, 31 of the lugs, this acting to substantially hold the band elements against retraction and to take up the tension exerted by the springs of the retractor elements. Thus, when the bands are connected together, namely, are engaged around the user with the buckle elements 15 and 16 interengaged, the tension of the retractors 20 will be absorbed by the locking coaction between the bight portions 25 and the catch lugs 30, 30. This substantially protects the user from the tension of the retractors, and prevents discomfort which otherwise would be experienced by the retractible force exerted thereby.

The concave edges 31 of the catch lugs 30 are shaped so as to allow the bight elements 25 to automatically disengage therefrom when the flexible bands are disconnected from each other, namely, when the tongue element 15 is released from the buckle member 16, for example, by moving the button 19 leftwards, as viewed in FIGURE 2. Thus, the upper end portions of the concave edges 31 are arranged to be substantially perpendicular to a plane containing the top ends of the catch lugs and the axis of rotation of the associated loop member 24, as is diagrammatically illustrated in FIGURE 2. Thus, the plane 35 shown in FIGURE 2 contains the pivotal axis of the side arms 26 as well as the top ends of the catch lugs 30, and the top portions of the concave edges 31 are contained in a plane 36 which is substantially perpendicular to the plane 35. This arrangement facilitates the disengagement of the bight portions 25 from the catch lugs 30 when the bands of the seat belt assembly are disconnected, since the flexible bands are allowed to bend freely, in the manner shown in FIGURE 3, allowing the bight portions 25 to slip away from the concave edges 31 of the catch lugs 30. The spring force of the retractor members 20 also acts to urge the bight portions 25 away from the concave edges 31 of the catch lugs when the flexible bands are disconnected from each other. Thus, upon such disconnection the loop members 24 automatically disengage from the catch lugs 30 and the flexible bands roll up because of the action of their associated spring retractors 20, the plate elements 29 and their lugs 30, 30 being rolled up inside the coiled flexible bands.

When it is desired to again use the seat belt, the buckle elements 15 and 16 are then pulled together over the person's body and connected in the manner illustrated in FIGURES 1 and 2, namely, by engaging the tongue element 15 in the aperture of the buckle element 16. When the flexible bands are connected together in this manner, the bight portions 25 of the loop members 24 automatically slip over the triangular lugs 30 and lockingly engage with the concavely-shaped edges 31 in the manner above-described.

While a specific embodiment of an improved safety seat belt assembly for motor vehicles and the like has been disclosed in the above description, it will be understood that various modifications within the spirit of the invention may occur to those skilled in the art. Therefore, it is intended that no limitations be placed on the invention except as defined by the scope of the appended claims.

What is claimed is:

1. In a seat belt of the type comprising a flexible band adapted to be anchored at one end to a portion of a motor vehicle and provided at its other end with a buckle element adapted to lockingly interengage with a cooperating buckle element on a cooperating flexible band, a spring retractor secured to the band to roll up the band when it is not in use, the band being unrolled by exerting tension on the portion thereof adjacent the first-named buckle element, an arm connected to said spring retractor, and abutment means on the band lockingly engageable by said arm, said abutment means being located adjacent the connection of the band to the retractor and the arm being cooperable therewith to oppose the tension of the retractor when the band is in a substantially unrolled condition, wherein said arm comprises a loop member pivoted to the retractor on an axis transverse to the band, said loop member having a bight portion lockingly engageable with said abutment means, said bight portion extending transversely to the band and said abutment means comprising upstanding catch means extending longitudinally of the band, wherein the retractor has a generally cylindrical main body portion extending transverse to the band and said loop member is axially-pivoted to said retractor main body portion, and wherein said abutment means comprises a plate element secured to said band and formed with at least one upstanding generally triangular catch lug extending longitudinally of the band and having a concave edge facing the retractor and shaped to lockingly-receive said bight portion.

2. In a seat belt of the type comprising a flexible band adapted to be anchored at one end to a portion of a motor vehicle and provided at its other end with a buckle element adapted to lockingly interengage with a cooperating buckle element on a cooperating flexible band, a spring retractor secured to the band to roll up the band when it is not in use, the band being unrolled by exerting tension on the portion thereof adjacent the first-named buckle element, an arm connected to said spring retractor, and abutment means on the band lockingly engageable by said arm, said abutment means being located adjacent the connection of the band to the retractor, and the arm being cooperable therewith to oppose the tension of the retractor when the band is in a substantially unrolled condition, wherein said arm comprises a loop member pivoted to the retractor on an axis transverse to the band, said loop member having a bight portion lockingly engageable with said abutment means, and wherein said abutment means has a catch portion lockingly engageable by said bight portion, said catch portion having a configuration allowing the bight portion to slip off the catch portion under the force of the spring retractor when the first-named flexible band is disconnected from said cooperating flexible band.

3. The seat belt of claim 1, and wherein said plate element has respective upstanding catch lugs at its opposite ends extending longitudinally of the band and having respective concave edges facing the retractor and shaped to simultaneously lockingly-receive said bight portion.

4. The seat belt of claim 1, and wherein the upper end portion of said concave edge is substantially perpendicular to a plane containing the top end of said catch lug and the axis of rotation of the loop member, whereby said bight portion can readily disengage from the catch lug when the first-named band is disconnected from said cooperating flexible band.

References Cited

UNITED STATES PATENTS

| | | | |
|---|---|---|---|
| 1,023,816 | 4/1912 | Coggeshall | 242—107.2 |
| 2,655,324 | 10/1953 | Clark | 242—107.2 |
| 3,304,024 | 2/1967 | McAninch | 242—107.11 |

CASMIR A. NUNBERG, *Primary Examiner.*